US012610102B2

(12) United States Patent
Liu et al.

(10) Patent No.: US 12,610,102 B2
(45) Date of Patent: Apr. 21, 2026

(54) SMART CARD INTERFACE, DATA TRANSMISSION METHOD AND TELEVISION CHIP

(71) Applicants: Haining ESWIN Computing Technology Co., Ltd., Jiaxing (CN); Beijing ESWIN Computing Technology Co., Ltd., Beijing City (CN)

(72) Inventors: Xin Liu, Beijing City (CN); Ziming Yu, Beijing City (CN)

(73) Assignees: Haining ESWIN Computing Technology Co., Ltd., Jiaxing (CN); Beijing ESWIN Computing Technology Co., Ltd., Beijing City (CN)

( * ) Notice: Subject to any disclaimer, the term of this patent is extended or adjusted under 35 U.S.C. 154(b) by 6 days.

(21) Appl. No.: 18/911,450

(22) Filed: Oct. 10, 2024

(65) Prior Publication Data

US 2025/0119623 A1     Apr. 10, 2025

(30) Foreign Application Priority Data

Oct. 10, 2023     (CN) .......................... 202311311657.5

(51) Int. Cl.
*H04N 21/418* (2011.01)
(52) U.S. Cl.
CPC ................................ *H04N 21/4181* (2013.01)
(58) Field of Classification Search
None
See application file for complete search history.

(56) References Cited

U.S. PATENT DOCUMENTS 6,105,134 A   *   8/2000   Pinder ................... H04L 63/045
                                                          713/168
7,802,106 B2 *   9/2010   Benardeau ......... H04N 21/8166
                                                          380/240
(Continued)

FOREIGN PATENT DOCUMENTS

CA            2333743 A1 *  12/1999   ........ H04N 21/4181
JP            4786097 B2 *  10/2011   .......... H04N 21/436
WO     WO-9907150 A1 *   2/1999   ........... H04L 63/045

*Primary Examiner* — William J Kim
(74) *Attorney, Agent, or Firm* — Mendelsohn Dunleavy PC; Steve Mendelsohn; Kevin J. Dunleavy

(57) ABSTRACT

The present application provides a smart card interface, a data transmission method and a television chip. A first memory of the smart card interface is used for caching multiple pieces of indicator data corresponding to a video stream for a TV chip, and the multiple pieces of indicator data are used for determining a decryption key for the video stream. The transmitter is used for transmitting the multiple pieces of indicator data to a smart card sequentially; checking the multiple pieces of indicator data transmitted to the smart card to obtain a first check result of each of the multiple pieces of indicator data, where the first check result is used for indicating whether the smart card has successfully received the corresponding indicator data; and for any indicator data, determining whether to retransmit the indicator data to the smart card based on the first check result of the indicator data. The receiver is used for receiving multiple key data packets corresponding to the decryption key transmitted from the smart card, and caching the multiple key data packets in the second memory. By solutions of the present application, the efficiency of data transmission may be improved, and the problem of playback buffering of TV programs due to data transmission errors may be reduced.

19 Claims, 6 Drawing Sheets

(56)             References Cited

U.S. PATENT DOCUMENTS

| 2001/0001014 | A1* | 5/2001 | Akins, III | H04L 63/0428 |
| | | | | 348/E7.075 |
| 2001/0046299 | A1* | 11/2001 | Wasilewski | H04L 63/0823 |
| | | | | 380/282 |
| 2004/0123097 | A1* | 6/2004 | Ranjan | H04N 21/4367 |
| | | | | 713/153 |
| 2006/0274898 | A1* | 12/2006 | Pedlow, Jr. | H04N 21/4405 |
| | | | | 380/277 |
| 2007/0242829 | A1* | 10/2007 | Pedlow, Jr. | H04N 21/26606 |
| | | | | 380/277 |
| 2008/0250444 | A1* | 10/2008 | Thomas | G11B 20/00086 |
| | | | | 348/E7.06 |
| 2009/0138719 | A1* | 5/2009 | Franz | H04N 7/1675 |
| | | | | 713/176 |

* cited by examiner

The second memory caches the key data packet transmitted from the smart card — S41

Number of cached key data packets ≥ preset number? — S42

No

Yes

The reception unit determines a length of the valid data of the key data packet — S43

The reception unit caches the valid data in the second memory based on the length of the valid data — S44

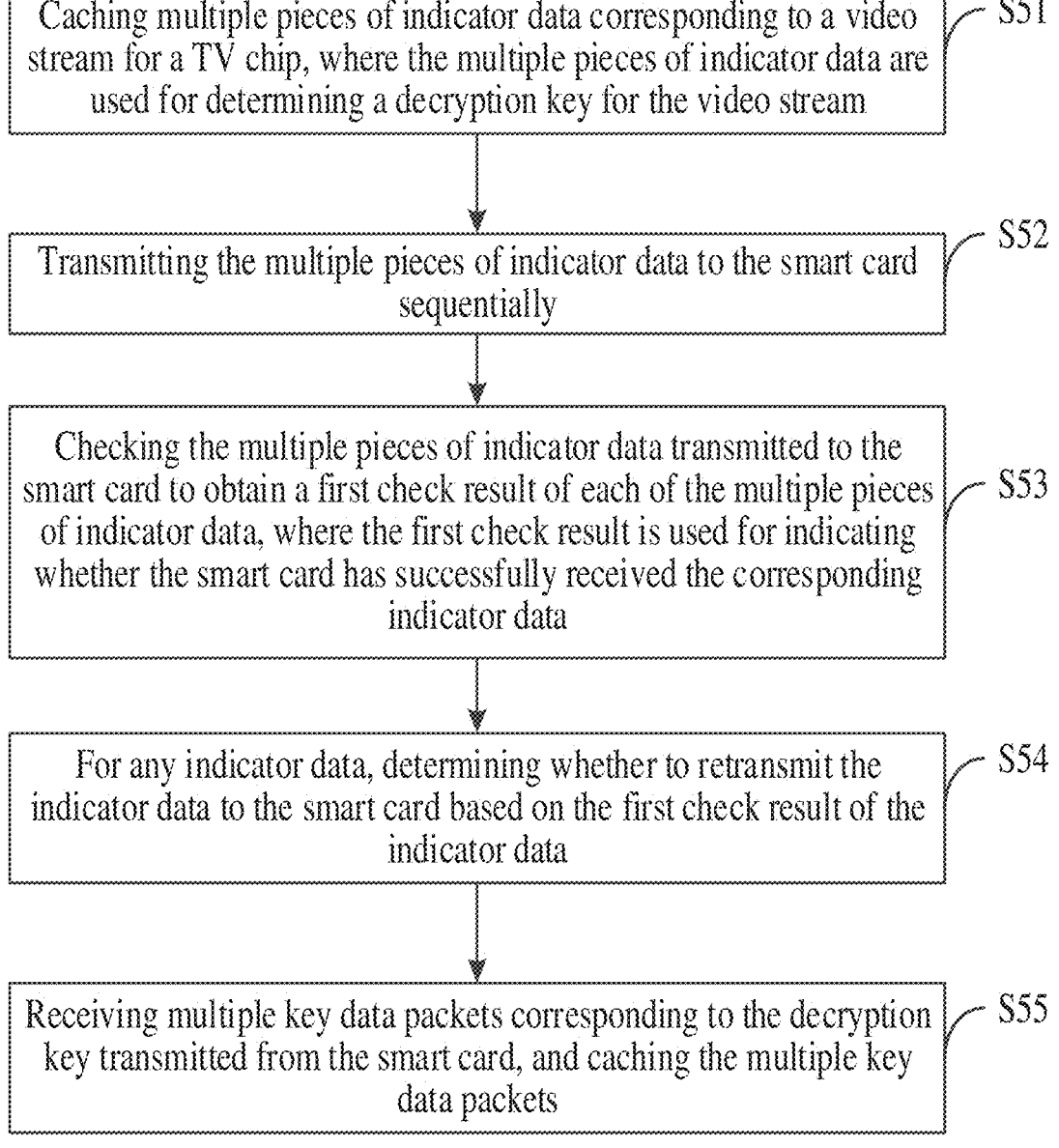

Caching multiple pieces of indicator data corresponding to a video stream for a TV chip, where the multiple pieces of indicator data are used for determining a decryption key for the video stream    ⌐ S51

Transmitting the multiple pieces of indicator data to the smart card sequentially    ⌐ S52

Checking the multiple pieces of indicator data transmitted to the smart card to obtain a first check result of each of the multiple pieces of indicator data, where the first check result is used for indicating whether the smart card has successfully received the corresponding indicator data    ⌐ S53

For any indicator data, determining whether to retransmit the indicator data to the smart card based on the first check result of the indicator data    ⌐ S54

Receiving multiple key data packets corresponding to the decryption key transmitted from the smart card, and caching the multiple key data packets    ⌐ S55

FIG. 5

SMART CARD INTERFACE, DATA TRANSMISSION METHOD AND TELEVISION CHIP

FIELD

The present application relates to the field of chips, and in particular to a smart card interface, a data transmission method and a television (TV) chip.

BACKGROUND

A condition access system (CAS) is a key technology for developing paid television (TV) programs, which enables operators to authorize and control subscribers to watch various services provided by the operators.

In order to prevent the CAS system from being cracked and improve the security of watching paid programs, a string of specific keys needs to be obtained during the playback of a scrambled TV stream to decrypt the scrambled TV stream. For a traditional CAS system, a strategy of disposing a decryption device outside is adopted. After generating the key, the decryption device transmits the key to the TV chip. Therefore, a corresponding data transmission procedure is involved between the TV chip and the decryption device.

However, the robustness of the data transmission procedure between the TV chip and the decryption device through a smart card interface is not high, which easily results in playback buffering of TV programs.

BRIEF SUMMARY

The present application provides a smart card interface, a data transmission method and a television (TV) chip, which solve a problem of playback buffering of TV programs due to insufficient robustness of the data transmission procedure between the TV chip and the decryption device through the smart card interface.

The present application provides a smart card interface, including a data transceiver, where the data transceiver includes a transmitter, a receiver, a first memory and a second memory, where the first memory is used for caching multiple pieces of indicator data corresponding to a video stream for a TV chip, and the multiple pieces of indicator data are used for determining a decryption key for the video stream;

the transmitter is used for transmitting the multiple pieces of indicator data to a smart card sequentially; checking the multiple pieces of indicator data transmitted to the smart card to obtain a first check result of each of the multiple pieces of indicator data, where the first check result is used for indicating whether the smart card has successfully received the corresponding indicator data; and for any indicator data, determining whether to retransmit the indicator data to the smart card based on the first check result of the indicator data; and the receiver is used for receiving multiple key data packets corresponding to the decryption key transmitted from the smart card, and caching the multiple key data packets in the second memory.

In an embodiment, for any indicator data, the transmitter is used for:

generating a first check bit of the indicator data;

transmitting the indicator data to the smart card;

receiving a second check bit of the indicator data transmitted from the smart card;

determining not to retransmit the indicator data to the smart card in case that the first check bit is same as the second check bit; and retransmitting the indicator data to the smart card in case that the first check bit is different from the second check bit.

In an embodiment, transmitting, by the transmitter, the multiple pieces of indicator data to the smart card sequentially includes:

receiving a first indication signal transmitted from a processor in the TV chip, where the first indication signal is used for indicating that the multiple pieces of indicator data has been cached to the first memory; and transmitting the multiple pieces of indicator data to the smart card sequentially based on the first indication signal.

In an embodiment, each of the multiple key data packets includes a header and valid data; and for any key data packet, caching, by the receiver, the multiple key data packets in the second memory includes:

determining a length of the valid data of the key data packet based on the header of the key data packet; and caching the valid data in the second memory based on the length of the valid data.

In an embodiment, for any key data packet, the receiver is further used for:

checking the key data packet to obtain a second check result of the key data packet, where the second check result is used for indicating whether the receiver has successfully received the valid data in the key data packet; and transmitting a second indication signal to the smart card in case that the second check result indicates that the receiver has not successfully received the valid data in the key data packet, where the second indication signal is used for indicating the smart card to retransmit the key data packet.

In an embodiment, the receiver is further used for:

transmitting a first interrupt signal to a processor in the TV chip in case that a number of key data packets cached in the second memory within a preset time period is less than a preset number;

receiving a third indication signal transmitted from the processor; and transmitting the third indication signal to the smart card, where the third indication signal is used for indicating the smart card to retransmit the multiple key data packets.

In an embodiment, the smart card interface further includes an asynchronous bridge, where for any indicator data, the asynchronous bridge is used for transmitting a first acknowledge signal to a processor in the TV chip after the first memory receives the indicator data, and the first acknowledge signal is used for indicating that the first memory has successfully received the indicator data; and for any key data packet, the asynchronous bridge is used for transmitting a second acknowledge signal to the smart card after the second memory receives the key data packet, and the second acknowledge signal is used for indicating that the second memory has successfully received the key data packet.

In an embodiment, the smart card interface further includes a delay circuit, where the delay circuit is used for maintaining a signal state between the smart card and the smart card interface to be a first state until a preset delay time is reached in case that the signal state is changed from the first state to a second state.

In an embodiment, the smart card interface further includes a counter and a deactivator, where the counter is used for determining a response time for data transmission between the smart card and the smart card interface; and transmitting a second interrupt signal to the deactivator in case that the response time is greater than or equal to a first preset response time, or less than or equal to a second preset response time, where the first preset response time is greater than the second preset response time; and the deactivator is used for performing a deactivation operation based on the second interrupt signal.

In an embodiment, the smart card interface further includes a clock stop circuit, where the clock stop circuit is used for transmitting, in case that the smart card interface does not receive data transmitted from the smart card within a preset duration and no data is transmitted to the smart card within the preset duration, a fourth indication signal to the smart card where the fourth indication signal is used for indicating that a clock of the smart card is set to a specified value, and the specified value is less than an operating clock of the smart card.

The present application further provides a data transmission method, including:

caching multiple pieces of indicator data corresponding to a video stream for a TV chip, where the multiple pieces of indicator data are used for determining a decryption key for the video stream;

transmitting the multiple pieces of indicator data to the smart card sequentially;

checking the multiple pieces of indicator data transmitted to the smart card to obtain a first check result of each of the multiple pieces of indicator data, where the first check result is used for indicating whether the smart card has successfully received the corresponding indicator data;

for any indicator data, determining whether to retransmit the indicator data to the smart card based on the first check result of the indicator data; and receiving multiple key data packets corresponding to the decryption key transmitted from the smart card, and caching the multiple key data packets.

In an embodiment, for any indicator data, determining whether to retransmit the indicator data to the smart card based on the first check result of the indicator data includes:

generating a first check bit of the indicator data;

transmitting the indicator data to the smart card;

receiving a second check bit of the indicator data transmitted from the smart card;

determining not to retransmit the indicator data to the smart card in case that the first check bit is same as the second check bit; and retransmit the indicator data to the smart card in case that the first check bit is different from the second check bit.

In an embodiment, transmitting the multiple pieces of indicator data to the smart card sequentially includes:

receiving a first indication signal transmitted from a processor in the TV chip, where the first indication signal is used for indicating that the multiple pieces of indicator data has been cached to the first memory; and transmitting the multiple pieces of indicator data to the smart card sequentially based on the first indication signal.

In an embodiment, each of the multiple key data packets includes a header and valid data; and for any key data packet, caching the multiple key data packets includes:

determining a length of the valid data of the key data packet based on the header of the key data packet; and caching the valid data in the second memory based on the length of the valid data.

In an embodiment, for any key data packet, the method further includes:

checking the key data packet to obtain a second check result of the key data packet, where the second check result is used for indicating whether the valid data in the key data packet has been successfully received; and transmitting a second indication signal to the smart card in case that the second check result indicates that the valid data in the key data packet has not been successfully received, where the second indication signal is used for indicating the smart card to retransmit the key data packet.

In an embodiment, the method further includes:

transmitting a first interrupt signal to a processor in the TV chip in case that a number of key data packets cached in the second memory within a preset time period is less than a preset number;

receiving a third indication signal transmitted from the processor; and transmitting the third indication signal to the smart card, where the third indication signal is used for indicating the smart card to retransmit the multiple key data packets.

In an embodiment, the method further includes:

for any indicator data, transmitting a first acknowledge signal to a processor in the TV chip after the indicator data are received and the first acknowledge signal is used for indicating that the indicator data have been successfully received; and for any key data packet, transmitting a second acknowledge signal to the smart card after the key data packet is received, and the second acknowledge signal is used for indicating that the key data packet has been successfully received.

In an embodiment, the method further includes:

maintaining a signal state between the smart card and the smart card interface to be a first state until a preset delay time is reached in case that the signal state is changed from the first state to a second state.

In an embodiment, the method further includes:

determining a response time for data transmission between the smart card and the smart card interface; and performing a deactivation operation in case that the response time is greater than or equal to a first preset response time, or less than or equal to a second preset response time, where the first preset response time is greater than the second preset response time.

In an embodiment, the method further includes:

transmitting, in case that data transmitted from the smart card does not be received within a preset duration and no data is transmitted to the smart card within the preset duration, a fourth indication signal to the smart card, where the fourth indication signal is used for indicating that a clock of the smart card is set to a specified value, and the specified value is less than an operating clock of the smart card.

The present application further provides a TV chip, including the smart card interface as described above.

The present application further provides a non-transitory computer-readable storage medium storing a computer program, and the computer program, when executed by a processor, performs the data transmission method as described above.

The smart card interface provided by the present application includes a data transceiver, where the data transceiver includes a transmitter, a receiver, a first memory and a second memory. The first memory is used for caching multiple pieces of indicator data corresponding to a video stream for a TV chip, and the multiple pieces of indicator data are used for determining a decryption key for the video stream. The transmitter is used for transmitting the multiple pieces of indicator data to a smart card sequentially; checking the multiple pieces of indicator data transmitted to the smart card to obtain a first check result of each of the multiple pieces of indicator data, where the first check result is used for indicating whether the smart card has successfully received the corresponding indicator data; and for any indicator data, determining whether to retransmit the indicator data to the smart card based on the first check result of the indicator data. By checking each piece of indicator data and retransmitting the indicator data with transmission errors, the efficiency of data transmission may be improved, the robustness of the data transmission procedure may be improved, and the problem of playback buffering of TV programs due to data transmission errors may be reduced. The receiver is used for receiving multiple key data packets corresponding to the decryption key transmitted from the smart card, and caching the multiple key data packets in the second memory. The TV chip may obtain the decryption key based on the key data packet in time and play the TV programs.

BRIEF DESCRIPTION OF THE DRAWINGS

In order to illustrate the solutions in the embodiments of the present application or in the related art more clearly, the drawings used in the description of the embodiments or the related art are briefly described below. The drawings in the following description are only some embodiments of the present application, and other drawings may be obtained according to these drawings without any creative work for those skilled in the art.

FIG. 5 is a schematic flow chart of a data transmission method according to an embodiment of the present application.

DETAILED DESCRIPTION

In order to illustrate the objects, solutions and advantages of the application, the solutions in present the application will be described clearly and completely below in combination with the drawings in the application. The described embodiments are part of the embodiments of the application, not all of them. All other embodiments obtained by a person of ordinary skill in the art based on the embodiments of the present application without any creative work belong to the scope of the present application.

A condition access system (CAS) is a key technology for developing paid TV programs, which enables operators to authorize and control subscribers to watch various services provided by the operators. Only authorized subscribers may play a designated paid encrypted program through the CAS system.

In order to prevent the CAS system from being cracked and improve the security of watching paid programs, a string of specific keys needs to be obtained in time during the playback of a scrambled TV stream to decrypt the scrambled TV stream.

For a traditional CAS system, a strategy of disposing a decryption device outside is adopted no matter it is a CAS system with a card design or a CAS system with an external chip. After generating the key, the decryption device transmits the key to the TV chip. Therefore, a corresponding data transmission procedure is involved between the TV chip and the decryption device. Therefore, a special smart card interface is required to perform data transmission between the TV chip and an off-chip decryption device (also called a smart card).

Currently, a data transmission rule between the TV chip and the smart card based on the smart card interface is agreed by an ISO-7816 protocol. The ISO-7816 protocol is a universal smart card interaction protocol that agrees the electrical information of a contact interface between the smart card and the card slot, and specifies a half-duplex data transmission rule.

Although the ISO-7816 protocol has agreed basic data interaction between the smart card and the TV chip, data transmission anomalies may occur in some cases since the robustness of the data transmission procedure is not high. Although the ISO-7816 protocol agrees that the correctness of data transmission may be checked by cyclic redundancy check (CRC), this check is performed after the data transmission is completed, resulting in a slow response, which in turn causes the CAS system to fail to decrypt and the encrypted TV program to be buffered.

On this basis, an embodiment of the present application provides a smart card interface for solving the above problems.

Figure 1:
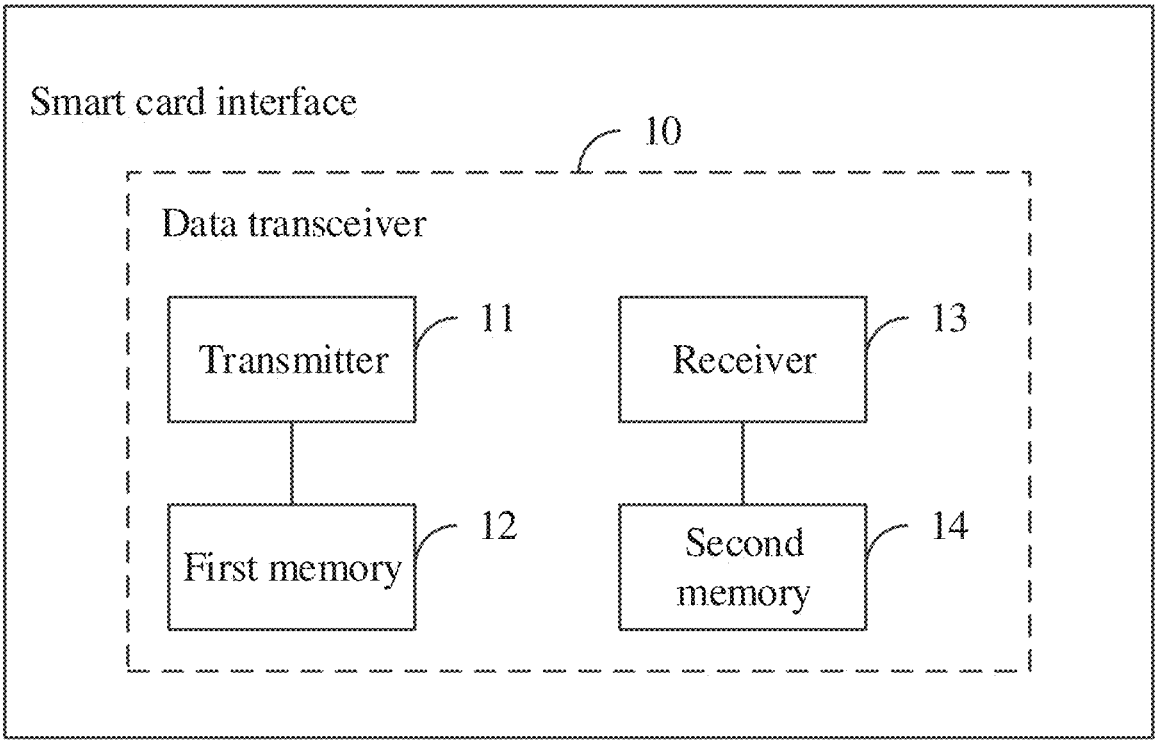
FIG. 1 is a schematic structural diagram of a smart card interface according to an embodiment of the present application.

FIG. 1 is a schematic structural diagram of a smart card interface according to an embodiment of the present application. As shown in FIG. 1, the smart card interface includes a data transceiver 10, where the data transceiver 10 further includes a transmitter 11, a first memory 12, a receiver 13 and a second memory 14.

The first memory 12 is used for caching multiple pieces of indicator data corresponding to a video stream for a TV chip, and the multiple pieces of indicator data are used for determining a decryption key for the video stream.

The transmitter 11 is used for transmitting the multiple pieces of indicator data to a smart card sequentially; checking the multiple pieces of indicator data transmitted to the smart card to obtain a first check result of each of the multiple pieces of indicator data, where the first check result is used for indicating whether the smart card has successfully received the corresponding indicator data; and for any indicator data, determining whether to retransmit the indicator data to the smart card based on the first check result of the indicator data.

The receiver 13 is used for receiving multiple key data packets corresponding to the decryption key transmitted from the smart card, and caching the multiple key data packets in the second memory 14.

Both smart card and TV chip in the present application are components of the CAS system, and the smart card interface is a component of the TV chip.

A scrambled video stream is continuously transmitted to the TV chip. The TV chip needs to transmit associated data of the video stream of the current stage to the smart card at regular intervals. The associated data of the video stream are used by the smart card to decrypt the video stream of the current stage.

In an embodiment, the associated data of the video stream are usually divided into corresponding multiple pieces of indicator data for transmission since they are large. The TV chip includes a processor, and the processor of the TV chip writes multiple pieces of indicator data corresponding to the video stream into the first memory 12 of the smart card interface. These multiple pieces of indicator data are used for determining the decryption key for the video stream.

After the first memory 12 caches the multiple pieces of indicator data corresponding to the video stream, the transmitter 11 transmits the multiple pieces of indicator data to the smart card sequentially.

In the procedure of transmitting, by the transmitter 11, the multiple pieces of indicator data to the smart card, the transmitter 11 also checks the multiple pieces of indicator data transmitted to the smart card to obtain a first check result of each of the multiple pieces of indicator data. The first check result is used for indicating whether the smart card has successfully received the indicator data corresponding to the video stream.

The transmitter 11 also transmits the multiple pieces of indicator data to the smart card sequentially since the first memory 12 receives the multiple pieces of indicator data sequentially. For any indicator data, after the transmitter 11 transmits the indicator data to the smart card, the transmitter 11 needs to check the currently transmitted indicator data to determine whether the smart card has successfully received the indicator data. There may be multiple check processing modes, such as parity check, CRC check or other possible check modes. The specific check procedures may include that after transmitting the indicator data, the transmitter 11 waits to receive a check bit transmitted from the smart card, and determines whether the indicator data is correctly received by the smart card based on the check bit transmitted from the smart card.

For any indicator data, the transmitter 11 determines whether to retransmit the indicator data to the smart card based on the first check result of the indicator data. In an embodiment, in case that the first check result of the indicator data indicates that the smart card has not successfully received the indicator data, the transmitter 11 retransmits the indicator data to the smart card. In case that the first check result of the indicator data indicates that the smart card has successfully received the indicator data, the transmitter 11 does not retransmit the indicator data to the smart card.

There are multiple pieces of indicator data, and the above operations are performed for each piece of indicator data. When an error occurs in the transmission of any indicator data, a retransmission operation may be performed to ensure the correctness and stability of the transmission.

After the smart card receives multiple pieces of indicator data, it calculates the decryption key for the video stream based on the multiple pieces of indicator data. The procedure of calculating, by the smart card, the decryption key may refer to the relevant introduction in the related art.

After calculating the decryption key, the smart card needs to transmit the decryption key to the TV chip for the TV chip to decrypt the video stream. The smart card divides the decryption key into multiple key data packets for transmission since the decryption key is usually large.

In an embodiment, the smart card obtains multiple key data packets based on the decryption key, and then transmits the multiple key data packets to the smart card interface. The receiver 13 receives the multiple key data packets transmitted from the smart card and caches them in the second memory 14. The TV chip decrypts the video stream based on the multiple key data packets to implement video playback.

In the above embodiment, the procedure of data transmission between the smart card and the TV chip based on the smart card interface is introduced. Solutions of the embodiments of the present application are further introduced below based on any of the above embodiments.

Figure 2:
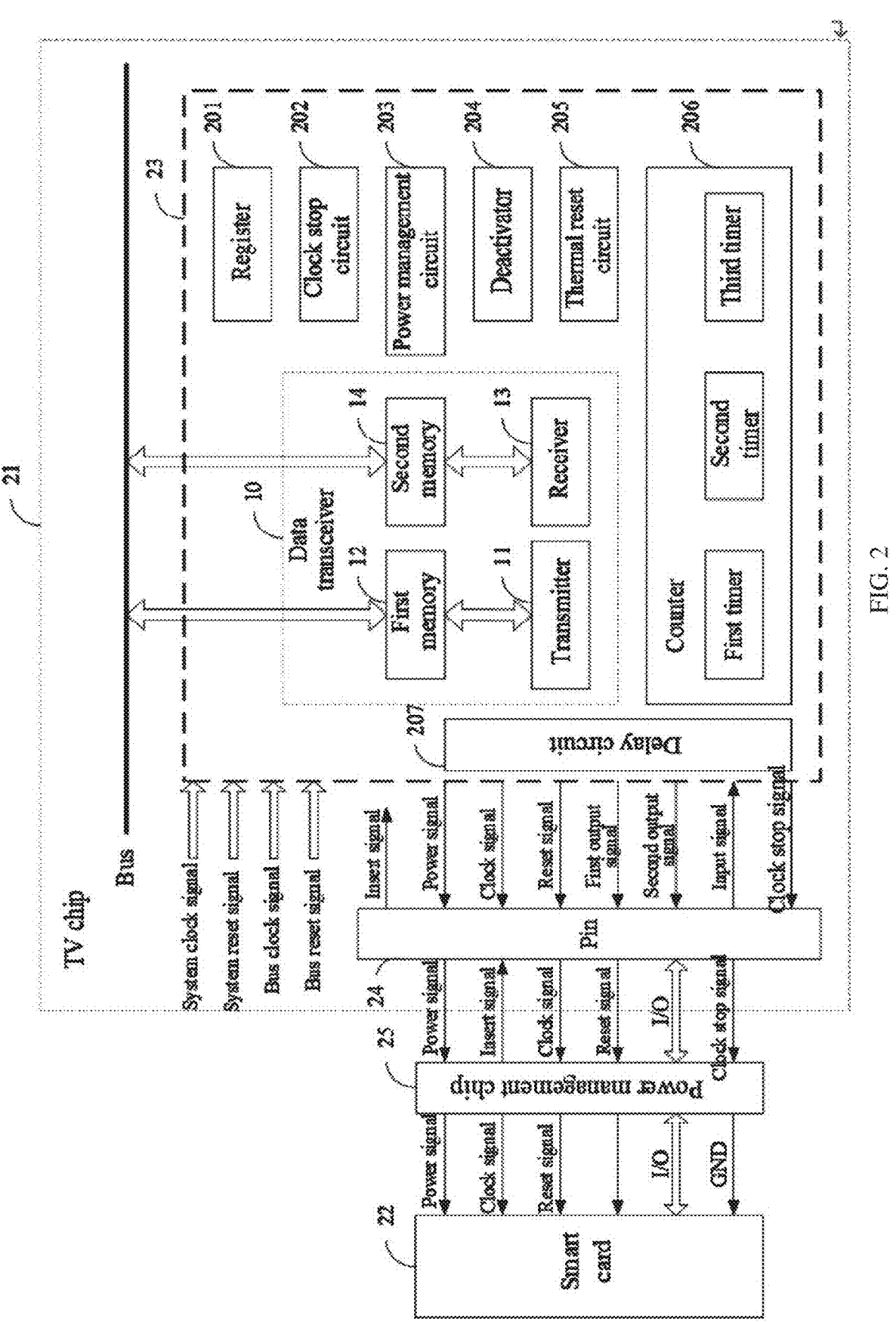
FIG. 2 is a schematic diagram of a data transmission procedure according to an embodiment of the present application.

FIG. 2 is a schematic diagram of a data transmission procedure according to an embodiment of the present application. As shown in FIG. 2, a TV chip 21 and a smart card 22 are included, and the TV chip 21 includes a smart card interface 23. Pins 24 and a power management chip 25 are further included between the smart card 22 and the smart card interface 23.

The pins 24 are pins for connecting the smart card interface 23 and the smart card 22, and the number of pins is multiple. The pins are used for transmitting signals, such as an insertion signal, a power signal, a clock signal, a reset signal, a first output signal, a second output signal, an input signal, a clock stop signal, etc. in FIG. 2. The power management chip 25 is used for managing a power supply of the smart card 22, for example, it may power on and off the smart card.

The processor in the TV chip 21 may set the operating clock of the entire system through the system clock signal, and the circuit of the entire TV chip 21 works normally. The processor may reset the entire system of the TV chip through the system reset signal and after the reset, the circuit of the TV chip 21 may obtain an initial value and work based on the initial value. The processor may set the operating clock of a bus through a bus clock signal, and control the reset operation of the bus based on the bus reset signal and the bus may work normally after the bus is reset and the clock is set.

The smart card interface 23 includes a data transceiver 10. The transmitter 11 and the first memory 12 in the data transceiver 10 jointly complete the data transmission from the TV chip 21 to the smart card 22, and the receiver 13 and the second memory 14 jointly complete the data transmission from the smart card 22 to the TV chip 21. The two procedures are introduced in conjunction with FIG. 3 and FIG. 4.

Figure 3:
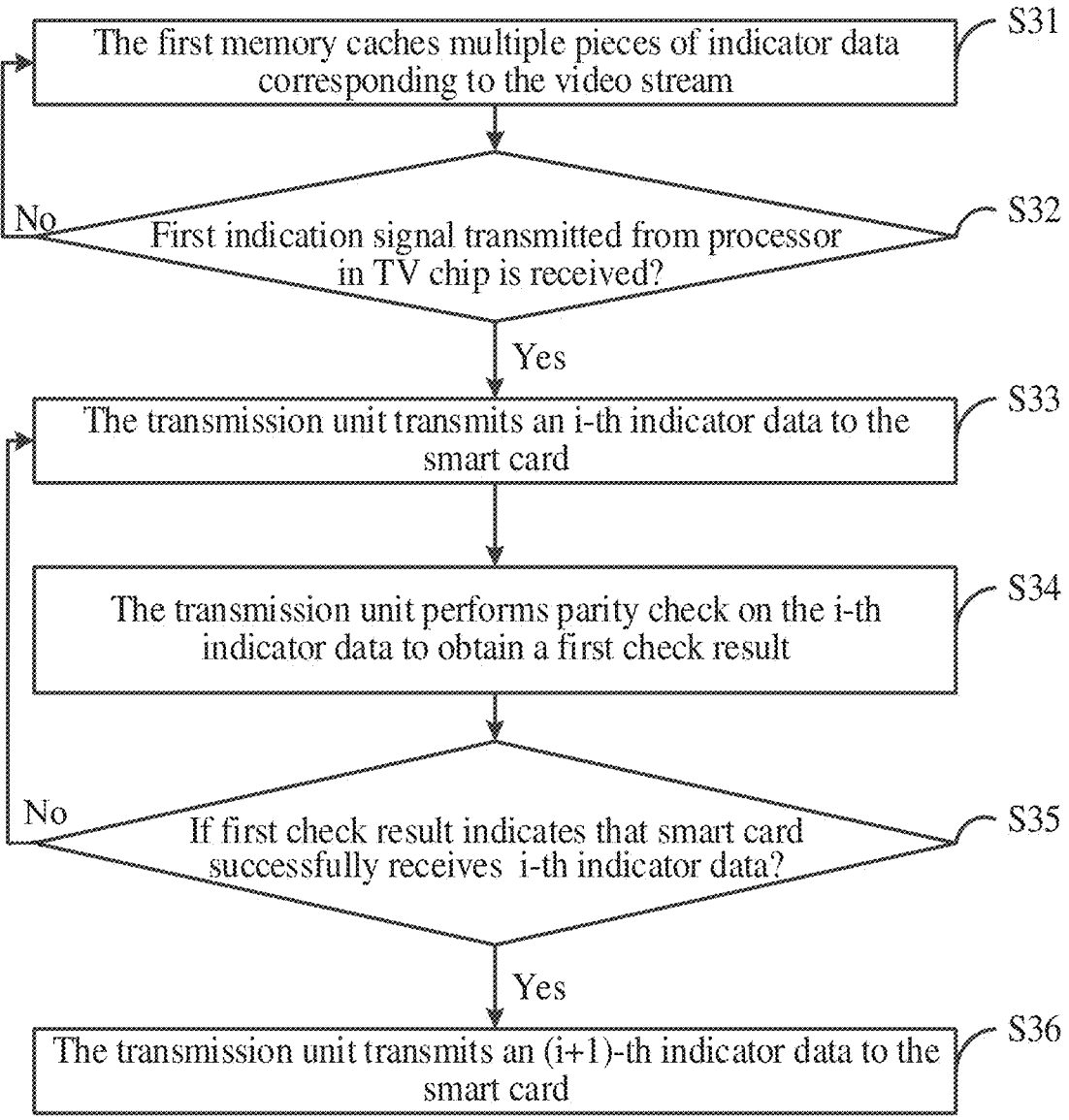
FIG. 3 is a schematic flow chart of transmission of indicator data according to an embodiment of the present application.

FIG. 3 is a schematic flow chart of transmission of indicator data according to an embodiment of the present application. As shown in FIG. 3, the transmission of indicator data includes the following steps.

S31: the first memory caches multiple pieces of indicator data corresponding to the video stream.

The processor of the TV chip transmits multiple pieces of indicator data to the smart card interface sequentially, and these multiple pieces of indicator data are cached in the first memory sequentially.

In some embodiments, the smart card interface circuit needs to interact data with the TV chip. There is a problem of clock domain crossing in the data interaction process, that is, the operating clock of the smart card interface has a different cycle from the operating clock of the TV chip, which will lead to the correctness of data transmission.

The clock cycle is a time unit for data transmission in the circuit, and one piece of data is transmitted in each clock cycle. The cross-clock domain problem is a problem occurring in the data transmission procedure due to difference between the operating clock cycle of the smart card interface and the operating clock cycle of the TV chip.

An example is taken for illustration. The operating clock cycle of the TV chip is 1 s, that is, the TV chip transmits an indicator data to the smart card interface every 1 s. The operating clock cycle of the smart card interface is 2 s, that is, the smart card interface checks whether new data has been received every 2 s. Due to the different operating clock cycles of the TV chip and the smart card interface, the smart card interface may fail to successfully receive some indicator data transmitted from the TV chip.

In order to solve the problem of clock domain crossing, an asynchronous bridge is disposed in the smart card interface. In an embodiment, the asynchronous bridge is disposed in the register 201 of the example in FIG. 2. for any indicator data transmitted from the TV chip, the asynchronous bridge transmits a first acknowledge signal to a processor in the TV chip after the first memory of the smart card interface receives the indicator data, and the first acknowledge signal is used for indicating that the first memory has successfully received the indicator data. In case that the processor of the TV chip successfully receives the first acknowledge signal for a certain indicator data transmitted from the asynchronous bridge within a predetermined period after transmitting the indicator data, it means that the smart card interface has successfully received the indicator data and may start transmitting the next indicator data. In case that the first acknowledge signal for the indicator data transmitted from the asynchronous bridge is not received within the predetermined period, the indicator data needs to be retransmitted to the smart card interface.

It may be seen that the asynchronous bridge transmits the indicator data between the smart card interface and the TV chip through a handshake protocol when the clock cycles between the smart card interface and the TV chip are different, to ensure that each piece of indicator data transmitted from the TV chip may be successfully received by the smart card interface, avoiding the problem of indicator data transmission errors caused by clock domain crossing problems.

S32: it is determined that whether the first indication signal transmitted from the processor in the TV chip is received. If so, S33 is performed, otherwise, S31 is performed.

After the TV chip completely transmits multiple pieces of indicator data, the processor in the TV chip will transmit a first indication signal to the smart card interface. The first indication signal belongs to a data transmission indication signal, which is used for indicating that multiple pieces of indicator data have been cached in the first memory, and may also be used for indicating that the smart card interface may transmit these multiple pieces of indicator data. After receiving the first indication signal transmitted from the processor in the TV chip, the transmitter of the smart card interface transmits multiple pieces of indicator data to the smart card sequentially based on the first indication signal.

S33: the transmitter transmits an i-th indicator data to the smart card.

The i-th indicator data is the i-th indicator data among the multiple pieces of indicator data, and i is a positive integer. In the embodiment of the present application, the i-th indicator data is the currently transmitted indicator data, and the value of i will change as the transmission procedure proceeds.

S34: the transmitter performs parity check on the i-th indicator data to obtain a first check result.

For any i-th indicator data, the transmitter first generates the first check bit of the i-th indicator data after receiving the i-th indicator data. The transmitter then transmits the i-th indicator data to the smart card.

After receiving the i-th indicator data, the smart card generates a second check bit based on the received i-th indicator data, and transmits the second check bit to the transmitter.

S35: it is determined that whether the first check result indicates that the smart card successfully receives the i-th indicator data. If so, S36 is performed, otherwise, S33 is performed.

In case that the smart card successfully and correctly receives the i-th indicator data, the first check bit and the second check bit of the i-th indicator data should be the same. Otherwise, the smart card does not successfully and correctly receive the i-th indicator data, the first check bit and the second check bit of the i-th indicator data are different.

Therefore, the transmitter determines not to retransmit the i-th indicator data to the smart card when the first check bit is the same as the second check bit. The transmitter retransmits the i-th indicator data to the smart card in case that the first check bit is different from the second check bit.

S36: the transmitter transmits an (i+1)-th indicator data to the smart card.

After the smart card successfully receives the i-th indicator data, the transmitter may transmit the next indicator data, i.e., the (i+1)-th indicator data, to the smart card until multiple pieces of indicator data are successfully transmitted to the smart card.

In the procedure that the TV chip transmits multiple pieces of indicator data to the smart card through the smart card interface, the smart card interface checks each transmitted indicator data to determine whether the smart card has successfully received each piece of indicator data. For the unsuccessfully transmitted indicator data, the corresponding indicator data is retransmitted through the retransmission mechanism, to ensure the correctness of each piece of indicator data transmission, instead of checking the correctness of the indicator data transmission after all the indicator data are fully transmitted, and both the data transmission efficiency and the response speed are improved.

In the above embodiment, the procedure of transmitting indicator data from the TV chip to the smart card is introduced and a procedure of transmitting the key data packet from the smart card to the TV chip is described below.

Figure 4:
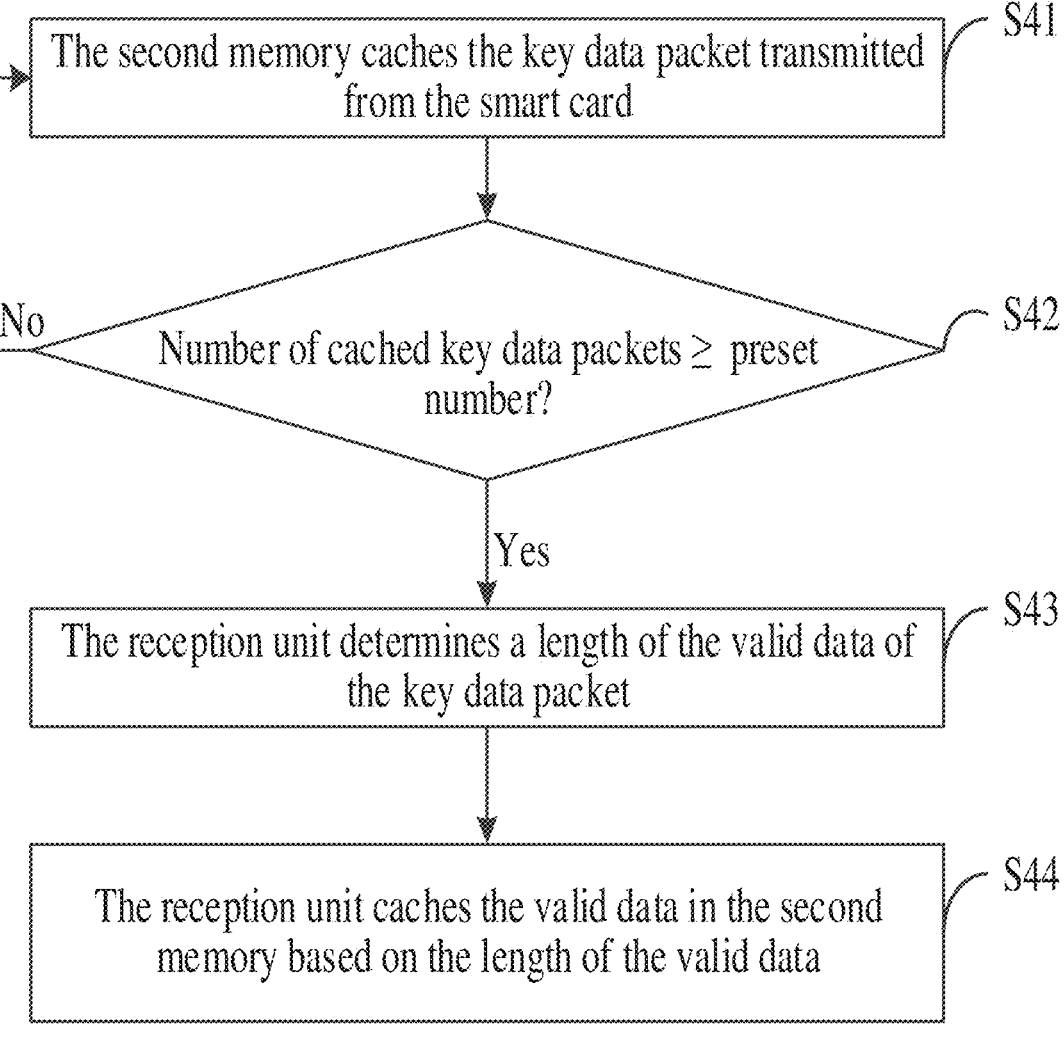
FIG. 4 is a schematic flow chart of transmission of a key data packet according to an embodiment of the present application.

FIG. 4 is a schematic flow chart of transmission of a key data packet according to an embodiment of the present application. As shown in FIG. 4, the transmission of the key data packet includes the following steps.

S41: the second memory caches the key data packet transmitted from the smart card.

The smart card transmits multiple key data packets to the smart card interface sequentially, and these multiple key data packets are cached in the second memory sequentially. The multiple key data packets are used for determining the decryption key for decrypting the video stream.

In an embodiment, the smart card interface circuit needs to interact data with the smart card. There is a problem of clock domain crossing in the data interaction process, that is, the operating clock of the smart card interface has a different cycle from the operating clock of the smart card, which will lead to the correctness of data transmission.

An example is taken for illustration. The operating clock cycle of the smart card is 1 s, that is, the smart card transmits a key data packet to the smart card interface every 1 s. The operating clock cycle of the smart card interface is 2 s, that is, the smart card interface checks whether new data has been received every 2 s. Due to the different operating clock cycles of the smart card and the smart card interface, the smart card interface may fail to successfully receive part of the key data packet transmitted from the smart card.

In order to solve the problem of clock domain crossing, an asynchronous bridge is disposed in the smart card interface. for any key data packet transmitted from the smart card, the asynchronous bridge transmits a second acknowledge signal to the smart card after the second memory of the smart card interface receives the key data packet, and the second acknowledge signal is used for indicating that the second memory has successfully received the key data packet. In case that the smart card successfully receives the second acknowledge signal for a certain key data packet transmitted from the asynchronous bridge within a predetermined period after transmitting the key data packet, it means that the smart card interface has successfully received the key data packet and may start transmitting the next key data packet. In case that the second acknowledge signal for the key data packet transmitted from the asynchronous bridge is not received within the predetermined period, the key data packet needs to be retransmitted to the smart card interface.

It may be seen that the asynchronous bridge transmits the key data packet between the smart card interface and the smart card through a handshake protocol when the clock cycles between the smart card interface and the smart card are different, to ensure that each key data packet transmitted from the smart card may be successfully received by the smart card interface, avoiding the problem of key data packet transmission errors caused by clock domain crossing problems.

S42: it is determined whether the number of cached key data packets is greater than or equal to the preset number. If so, S43 is performed, otherwise, S41 is performed.

In case that the number of key data packets cached in the second memory reaches the preset number, the procedure in which the TV chip reads the data in the key data packet from the second memory would be initiated.

In case that the number of key data packets cached in the second memory within the preset period is less than the preset number, it means that there is a problem occurring in the procedure in which the smart card transmits the key data packet to the smart card interface, resulting in the number of key data packets cached in the second memory failing to reach the preset number. In this case, the receiver transmits a first interrupt signal to the processor in the TV chip, and the first interrupt signal is used for indicating the TV chip to notify the smart card to retransmit the key data packet.

After receiving the first interrupt signal, the processor transmits a third indication signal through the smart card interface. The smart card interface receives the third indication signal transmitted from the processor and transmits a third indication signal to the smart card, and the third indication signal is used for indicating the smart card to retransmit multiple key data packets. After receiving the third indication signal, the smart card retransmits the multiple key data packets to the smart card interface under the indication of the third indication signal.

S43: the receiver determines a length of the valid data of the key data packet.

S44: the receiver caches the valid data in the second memory based on the length of the valid data.

The key data packet includes a header and valid data, and information such as the length of the valid data is stored in the header. For example, the length information of the valid data may be stored in the third byte of the header. The receiver may determine the length of the valid data of the key data packet based on the header of the key data packet. The receiver then caches the valid data in the second memory based on the length of the valid data, and the processor may read the valid data from the second memory.

In an embodiment, for any key data packet, the receiver further checks the key data packet to obtain a second check result of the key data packet, where the second check result is used for indicating whether the receiver has successfully received the valid data in the key data packet.

The receiver transmits a second indication signal to the smart card in case that the second check result indicates that the receiver has not successfully received the valid data in the key data packet, and the second indication signal is used for indicating the smart card to retransmit the key data packet.

In case that multiple key data packets are successfully transmitted, the processor in the TV chip transmits a data reception signal to the register, indicating that the signal reception is completed to stop a maximum waiting time timing.

After multiple key data packets are completely transmitted, the TV chip may perform CRC check on all key data packets. In case that the CRC check passes, it indicates that the key data packet is transmitted completely and correctly. In case that the CRC check fails, it means that the key data packet is transmitted incorrectly and the smart card needs to be notified to retransmit the key data packet.

In the procedure of data transmission based on the ISO-7816 protocol, at a moment when the smart card is inserted into or removed from the smart card interface, the in-place signal of the smart card will enter a metastable state, which affects the normal operation of the entire CAS system.

As shown in FIG. 2, at the moment when the smart card is inserted into or removed from the smart card interface, the state of the insertion signal would change frequently or burr, and there is a problem of poor contact, resulting in frequent state switching, that is, the occurrence of metastable problems.

In order to solve this problem, in the embodiment of the present application, a delay circuit 207 is disposed in the smart card interface 23. In case that the signal state between the smart card 22 and the smart card interface 23 changes from a first state to a second state, the delay circuit 207 maintains the signal state as the first state until the preset delay duration is reached. A signal state between the smart card and the smart card interface is maintained to be a first state until a preset delay time is reached in case that the signal state is changed from the first state to a second state.

By disposing the delay circuit 207, the changed signal state is delayed until the changed signal state maintains the preset delay time in case that the signal state between the smart card 22 and the smart card interface 23 changes, which indicates that the changed signal state is stable. The changed signal is controlled to take effect and the metastable problem caused by frequent changes or burr in the signal state is effectively avoided.

As shown in FIG. 2, the smart card interface 23 further includes a thermal reset circuit 205, and the thermal reset circuit 205 is used for resetting and restarting the smart card 22 in case that an unknown error occurs in the communication procedure between the smart card interface 23 and the smart card 22.

As shown in FIG. 2, the smart card interface 23 further includes a power management circuit 203, and the power management circuit 203 may activate the smart card 22 and perform a power-on cold reset operation. When a power-on signal is received from the bus of the TV chip, the power management circuit 203 may operate the power signal, clock signal, reset signal and other signals based on the timing.

As shown in FIG. 2, the smart card interface 23 further includes a clock stop circuit 202. When the smart card 22 is in a non-working state for a long time in case that the smart card 22 supports a low power consumption mode, the clock stop circuit 202 may allow the clock of the smart card 22 to be set to a specified value to reduce power consumption. The smart card 22 is in a non-working state for a long time, which means that the duration during which no data is transmitted between the smart card interface 23 and the smart card 22 reaches a preset duration. In an embodiment, in case that the smart card interface 23 does not receive the data transmitted from the smart card 22 within the preset duration, and the smart card interface 23 does not transmit data to the smart card 22 within the preset duration, the clock stop circuit 202 transmits a fourth indication signal to the smart card 22 for indicating that the clock of the smart card 22 is set to a specified value, and the smart card 22 is controlled to enter the low power consumption mode. The specified value is less than an operating clock of the smart card 22.

As shown in FIG. 2, the smart card interface 23 further includes a counter 206 and a deactivator 204. The counter 206 includes a first timer, a second timer and a third timer, where the first timer is used for counting a time required for transmitting a data, the second timer is used for counting the shortest response time for data interaction between the smart card 22 and the smart card interface 23, and the third timer is used for counting the longest response time for data interaction between the smart card 22 and the smart card interface 23.

In an embodiment, the counter 206 is used for determining the response time for data transmission between the smart card 22 and the smart card interface 23. In case that the response time is greater than or equal to the first preset response time, or less than or equal to the second preset response time, it indicates that the smart card 22 does not match with the smart card interface 23, and the counter 206 transmits a second interrupt signal to the deactivator 204, for indicating that the smart card 22 does not match with the smart card interface 23. The first preset response time is an upper limit of the response time for data transmission between the smart card 22 and the smart card interface 23, the second preset response time is a lower limit of the response time for data transmission between the smart card 22 and the smart card interface 23, and the first preset response time is greater than the second preset response time.

After receiving the second interrupt signal, the deactivator 204 performs a deactivation operation based on the second interrupt signal. In an embodiment, when the information exchange is completed or terminated (the smart card 22 has no response, the smart card 22 is removed, etc.), the deactivator 204 may also operate the clock signal, reset signal, power signal and other signals based on the timing in the protocol, and the smart card interface 23 is disabled.

To sum up, the smart card interface provided by the embodiments of the present application includes a data transceiver, which includes a transmitter, a receiver, a first memory and a second memory. The first memory is used for caching multiple pieces of indicator data corresponding to a video stream for a TV chip, and the multiple pieces of indicator data are used for determining a decryption key for the video stream. The transmitter is used for transmitting the multiple pieces of indicator data to a smart card sequentially; checking the multiple pieces of indicator data transmitted to the smart card to obtain a first check result of each of the multiple pieces of indicator data, where the first check result is used for indicating whether the smart card has successfully received the corresponding indicator data; and for any indicator data, determining whether to retransmit the indicator data to the smart card based on the first check result of the indicator data. By checking each piece of indicator data and retransmitting the indicator data with transmission errors, the efficiency of data transmission may be improved, the robustness of the data transmission procedure may be improved, and the problem of playback buffering of TV programs due to data transmission errors may be reduced. The receiver is used for receiving multiple key data packets corresponding to the decryption key transmitted from the smart card, and caching the multiple key data packets in the second memory. The TV chip may obtain the decryption key based on the key data packet in time and play the TV program.

FIG. 5 is a schematic flow chart of a data transmission method according to an embodiment of the present application. The method is performed by a smart card interface. As shown in FIG. 5, the method includes:

S51: caching multiple pieces of indicator data corresponding to a video stream for a TV chip, where the multiple pieces of indicator data are used for determining a decryption key for the video stream;

S52: transmitting the multiple pieces of indicator data to the smart card sequentially;

S53: checking the multiple pieces of indicator data transmitted to the smart card to obtain a first check result of each of the multiple pieces of indicator data, where the first check result is used for indicating whether the smart card has successfully received the corresponding indicator data;

S54: for any indicator data, determining whether to retransmit the indicator data to the smart card based on the first check result of the indicator data; and S55: receiving multiple key data packets corresponding to the decryption key transmitted from the smart card, and caching the multiple key data packets.

In an embodiment, for any indicator data, determining whether to retransmit the indicator data to the smart card based on the first check result of the indicator data includes:

generating a first check bit of the indicator data;

transmitting the indicator data to the smart card;

receiving a second check bit of the indicator data transmitted from the smart card;

determining not to retransmit the indicator data to the smart card in case that the first check bit is same as the second check bit; and retransmit the indicator data to the smart card in case that the first check bit is different from the second check bit.

In an embodiment, transmitting the multiple pieces of indicator data to the smart card sequentially includes:

receiving a first indication signal transmitted from a processor in the TV chip, where the first indication signal is used for indicating that the multiple pieces of indicator data has been cached to the first memory; and transmitting the multiple pieces of indicator data to the smart card sequentially based on the first indication signal.

In an embodiment, each of the multiple key data packets includes a header and valid data; and for any key data packet, caching the multiple key data packets includes:

determining a length of the valid data of the key data packet based on the header of the key data packet; and caching the valid data in the second memory based on the length of the valid data.

In an embodiment, for any key data packet, the method further includes:

checking the key data packet to obtain a second check result of the key data packet, where the second check result is used for indicating whether the valid data in the key data packet has been successfully received; and transmitting a second indication signal to the smart card in case that the second check result indicates that the valid data in the key data packet has not been successfully received, where the second indication signal is used for indicating the smart card to retransmit the key data packet.

In an embodiment, the method further includes:

transmitting a first interrupt signal to a processor in the TV chip in case that a number of key data packets cached in the second memory within a preset time period is less than a preset number;

receiving a third indication signal transmitted from the processor; and transmitting the third indication signal to the smart card, where the third indication signal is used for indicating the smart card to retransmit the multiple key data packets.

In an embodiment, the method further includes:

for any indicator data, transmitting a first acknowledge signal to a processor in the TV chip after the indicator data are received and the first acknowledge signal is used for indicating that the indicator data have been successfully received; and for any key data packet, transmitting a second acknowledge signal to the smart card after the key data packet is received, and the second acknowledge signal is used for indicating that the key data packet has been successfully received.

In an embodiment, the method further includes:

maintaining a signal state between the smart card and the smart card interface to be a first state until a preset delay time is reached in case that the signal state is changed from the first state to a second state.

In an embodiment, the method further includes:

determining a response time for data transmission between the smart card and the smart card interface; and performing a deactivation operation in case that the response time is greater than or equal to a first preset response time, or less than or equal to a second preset response time, where the first preset response time is greater than the second preset response time.

In an embodiment, the method further includes:

transmitting, in case that data transmitted from the smart card does not be received within a preset duration and no data is transmitted to the smart card within the preset duration, a fourth indication signal to the smart card, where the fourth indication signal is used for indicating that a clock of the smart card is set to a specified value, and the specified value is less than an operating clock of the smart card.

Figure 6:
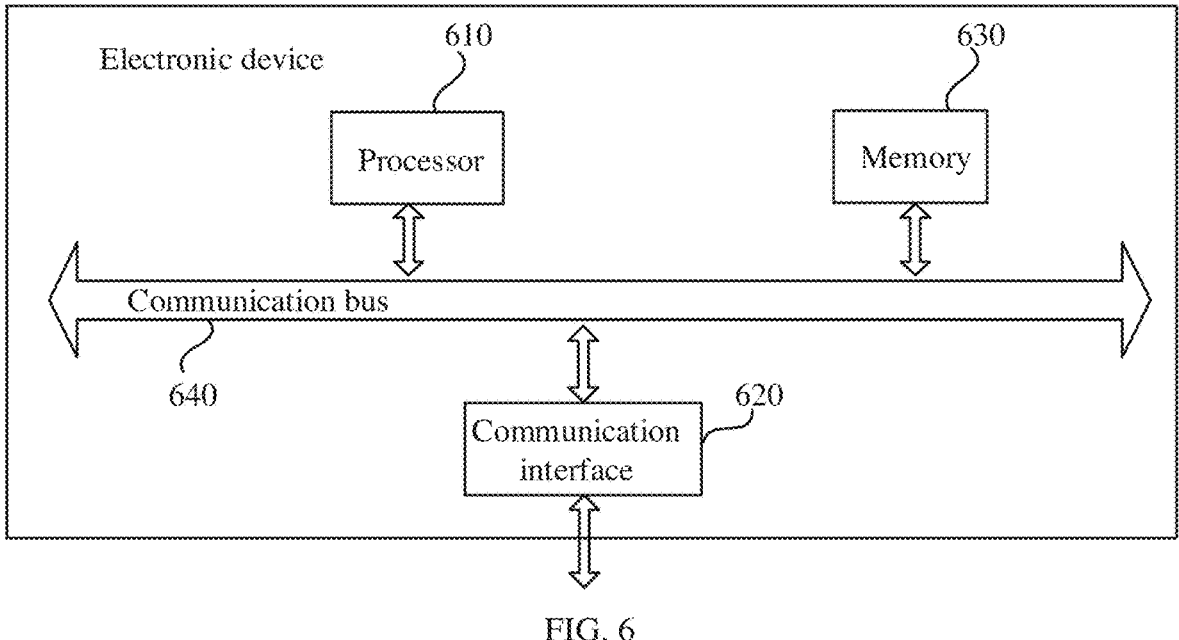
FIG. 6 is a schematic structural diagram of a physical structure of an electronic device according to an embodiment of the present application.

FIG. 6 is a schematic diagram of the physical structure of an electronic device. As shown in FIG. 6, the electronic device may include a processor 610, a communication interface 620, a memory 630, and a communication bus 640. The processor 610, the communication interface 620, and the memory 630 communicate with each other through the communication bus 640. The processor 610 calls a logical instruction in the memory 630 to perform a data transmission method. The data transmission method includes: caching multiple pieces of indicator data corresponding to a video stream for a TV chip, where the multiple pieces of indicator data are used for determining a decryption key for the video stream; transmitting the multiple pieces of indicator data to the smart card sequentially; checking the multiple pieces of indicator data transmitted to the smart card to obtain a first check result of each of the multiple pieces of indicator data, where the first check result is used for indicating whether the smart card has successfully received the corresponding indicator data; for any indicator data, determining whether to retransmit the indicator data to the smart card based on the first check result of the indicator data; and receiving multiple key data packets corresponding to the decryption key transmitted from the smart card, and caching the multiple key data packets.

In addition, the logic instructions in the memory 630 described above may be implemented in the form of a software functional unit and may be stored in a computer readable storage medium while being sold or used as a separate product. Based on such understanding, the solutions of the present application in essence or a part of the solutions that contributes to the prior art, or a part of the technical solutions, may be embodied in the form of a software product, which is stored in a storage medium, including several instructions to cause a computer device (which may be a personal computer, server, or network device, etc.) to perform all or part of the steps of the methods described in the respective embodiments of the present application. The storage medium described above includes various media that can store program codes such as U disk, mobile hard disk, read-only memory (ROM), random access memory (RAM), magnetic disk, or optical disk.

The present application further provides a non-transitory computer-readable storage medium storing a computer program, where the computer program, when executed by a processor, performs a data transmission method. The data transmission method includes: caching multiple pieces of indicator data corresponding to a video stream for a TV chip, where the multiple pieces of indicator data are used for determining a decryption key for the video stream; transmitting the multiple pieces of indicator data to the smart card sequentially; checking the multiple pieces of indicator data transmitted to the smart card to obtain a first check result of each of the multiple pieces of indicator data, where the first check result is used for indicating whether the smart card has successfully received the corresponding indicator data; for any indicator data, determining whether to retransmit the indicator data to the smart card based on the first check result of the indicator data; and receiving multiple key data packets corresponding to the decryption key transmitted from the smart card, and caching the multiple key data packets.

The present application further provides a TV chip, and the TV chip includes the smart card interface as described above.

The device embodiments described above are merely illustrative, where the units described as separate components may or may not be physically separate, and the components displayed as units may or may not be physical units, that is, may be located at the same place or be distributed to multiple network units. Some or all of the modules may be selected according to actual needs to achieve the purpose of the solution of the present embodiment. Those of ordinary skill in the art can understand and implement the embodiments described above without paying creative labors.

Through the description of the embodiments above, those skilled in the art can clearly understand that the various embodiments can be implemented by means of software and a necessary general hardware platform, and of course, by hardware. Based on such understanding, the technical solutions of the present application in essence or a part of the technical solutions that contributes to the prior art, or a part of the technical solutions, may be embodied in the form of a software product, which may be stored in a storage medium such as ROM/RAM, magnetic discs, optical discs, etc., and includes several instructions to cause a computer device (which may be a personal computer, server, or network device, etc.) to perform the methods described in various embodiments or a part thereof.

It should be noted that the above embodiments are only used to explain the solutions of the present application, and are not limited thereto; although the present application has been described in detail with reference to the foregoing embodiments, it should be understood by those skilled in the art that modifications to the technical solutions documented in the foregoing embodiments and equivalent substitutions to a part of the features can be made and these modifications and substitutions do not make the essence of the corresponding solutions depart from the scope of solutions of various embodiments of the present application.

What is claimed is:

1. A smart card interface, comprising a data transceiver, wherein the data transceiver comprises a transmitter, a receiver, a first memory and a second memory, wherein the first memory is used for caching multiple pieces of indicator data corresponding to a video stream for a television (TV) chip, and the multiple pieces of indicator data are used for determining a decryption key for the video stream;

the transmitter is used for transmitting the multiple pieces of indicator data to a smart card sequentially; checking the multiple pieces of indicator data transmitted to the smart card to obtain a first check result of each of the multiple pieces of indicator data, wherein the first check result is used for indicating whether the smart card has successfully received the corresponding indicator data; and for any indicator data, determining whether to retransmit the indicator data to the smart card based on the first check result of the indicator data; and the receiver is used for receiving multiple key data packets corresponding to the decryption key transmitted from the smart card, and caching the multiple key data packets in the second memory.

2. The smart card interface of claim 1, wherein for each piece of indicator data, the transmitter is used for:

generating a first check bit of the indicator data;

transmitting the indicator data to the smart card;

receiving a second check bit of the indicator data transmitted from the smart card;

determining not to retransmit the indicator data to the smart card in case that the first check bit is same as the second check bit; and retransmitting the indicator data to the smart card in case that the first check bit is different from the second check bit.

3. The smart card interface of claim 2, wherein transmitting, by the transmitter, the multiple pieces of indicator data to the smart card sequentially comprises:

receiving a first indication signal transmitted from a processor in the TV chip, wherein the first indication signal is used for indicating that the multiple pieces of indicator data has been cached to the first memory; and transmitting the multiple pieces of indicator data to the smart card sequentially based on the first indication signal.

4. The smart card interface of claim 3, wherein each of the multiple key data packets comprises a header and valid data; and for any key data packet, caching, by the receiver, the multiple key data packets in the second memory comprises:

determining a length of the valid data of the key data packet based on the header of the key data packet; and caching the valid data in the second memory based on the length of the valid data.

5. The smart card interface of claim 4, wherein for any key data packet, the receiver is further used for:

checking the key data packet to obtain a second check result of the key data packet, wherein the second check result is used for indicating whether the receiver has successfully received the valid data in the key data packet; and transmitting a second indication signal to the smart card in case that the second check result indicates that the receiver has not successfully received the valid data in the key data packet, wherein the second indication signal is used for indicating the smart card to retransmit the key data packet.

6. The smart card interface of claim 4, wherein the receiver is further used for:

transmitting a first interrupt signal to a processor in the TV chip in case that a number of key data packets cached in the second memory within a preset time period is less than a preset number;

receiving a third indication signal transmitted from the processor; and transmitting the third indication signal to the smart card, wherein the third indication signal is used for indicating the smart card to retransmit the multiple key data packets.

7. The smart card interface of claim 2, wherein each of the multiple key data packets comprises a header and valid data; and for any key data packet, caching, by the receiver, the multiple key data packets in the second memory comprises:

determining a length of the valid data of the key data packet based on the header of the key data packet; and caching the valid data in the second memory based on the length of the valid data.

8. The smart card interface of claim 7, wherein for any key data packet, the receiver is further used for:

checking the key data packet to obtain a second check result of the key data packet, wherein the second check result is used for indicating whether the receiver has successfully received the valid data in the key data packet; and transmitting a second indication signal to the smart card in case that the second check result indicates that the receiver has not successfully received the valid data in the key data packet, wherein the second indication signal is used for indicating the smart card to retransmit the key data packet.

9. The smart card interface of claim 7, wherein the receiver is further used for:

transmitting a first interrupt signal to a processor in the TV chip in case that a number of key data packets cached in the second memory within a preset time period is less than a preset number;

receiving a third indication signal transmitted from the processor; and transmitting the third indication signal to the smart card, wherein the third indication signal is used for indicating the smart card to retransmit the multiple key data packets.

10. The smart card interface of claim 1, wherein each of the multiple key data packets comprises a header and valid data; and for any key data packet, caching, by the receiver, the multiple key data packets in the second memory comprises:

determining a length of the valid data of the key data packet based on the header of the key data packet; and caching the valid data in the second memory based on the length of the valid data.

11. The smart card interface of claim 10, wherein for any key data packet, the receiver is further used for:

checking the key data packet to obtain a second check result of the key data packet, wherein the second check result is used for indicating whether the receiver has successfully received the valid data in the key data packet; and transmitting a second indication signal to the smart card in case that the second check result indicates that the receiver has not successfully received the valid data in the key data packet, wherein the second indication signal is used for indicating the smart card to retransmit the key data packet.

12. The smart card interface of claim 10, wherein the receiver is further used for:

transmitting a first interrupt signal to a processor in the TV chip in case that a number of key data packets cached in the second memory within a preset time period is less than a preset number;

receiving a third indication signal transmitted from the processor; and transmitting the third indication signal to the smart card, wherein the third indication signal is used for indicating the smart card to retransmit the multiple key data packets.

13. The smart card interface of claim 1, further comprising an asynchronous bridge, wherein for any indicator data, the asynchronous bridge is used for transmitting a first acknowledge signal to a processor in the TV chip after the first memory receives the indicator data, and the first acknowledge signal is used for indicating that the first memory has successfully received the indicator data; or for any key data packet, the asynchronous bridge is used for transmitting a second acknowledge signal to the smart card after the second memory receives the key data packet, and the second acknowledge signal is used for indicating that the second memory has successfully received the key data packet.

14. The smart card interface of claim 1, further comprising a delay circuit, wherein the delay circuit is used for maintaining a signal state between the smart card and the smart card interface to be a first state until a preset delay time is reached in case that the signal state is changed from the first state to a second state.

15. The smart card interface of claim 1, further comprising a counter and a deactivator, wherein the counter is used for determining a response time for data transmission between the smart card and the smart card interface; and transmitting a second interrupt signal to the deactivator in case that the response time is greater than or equal to a first preset response time, or less than or equal to a second preset response time, wherein the first preset response time is greater than the second preset response time; and the deactivator is used for performing a deactivation operation based on the second interrupt signal.

16. The smart card interface of claim 1, further comprising a clock stop circuit, wherein the clock stop circuit is used for transmitting, in case that the smart card interface does not receive data transmitted from the smart card within a preset duration and no data is transmitted to the smart card within the preset duration, a fourth indication signal to the smart card, wherein the fourth indication signal is used for indicating that a clock of the smart card is set to a specified value, and the specified value is less than an operating clock of the smart card.

17. A television (TV) chip comprising a smart card interface of claim 1.

18. A data transmission method, comprising:

caching multiple pieces of indicator data corresponding to a video stream for a television (TV) chip, wherein the multiple pieces of indicator data are used for determining a decryption key for the video stream;

transmitting the multiple pieces of indicator data to the smart card sequentially;

checking the multiple pieces of indicator data transmitted to the smart card to obtain a first check result of each of the multiple pieces of indicator data, wherein the first check result is used for indicating whether the smart card has successfully received the corresponding indicator data;

for any indicator data, determining whether to retransmit the indicator data to the smart card based on the first check result of the indicator data; and receiving multiple key data packets corresponding to the decryption key transmitted from the smart card, and caching the multiple key data packets.

19. A non-transitory computer-readable storage medium storing a computer program, wherein the computer program, when executed by a processor, performs the data transmission method of claim 18.

* * * * *